Jan. 12, 1932.  C. T. HUTCHINSON  1,840,719
DENTAL FILM MOUNT
Filed Sept. 26, 1929
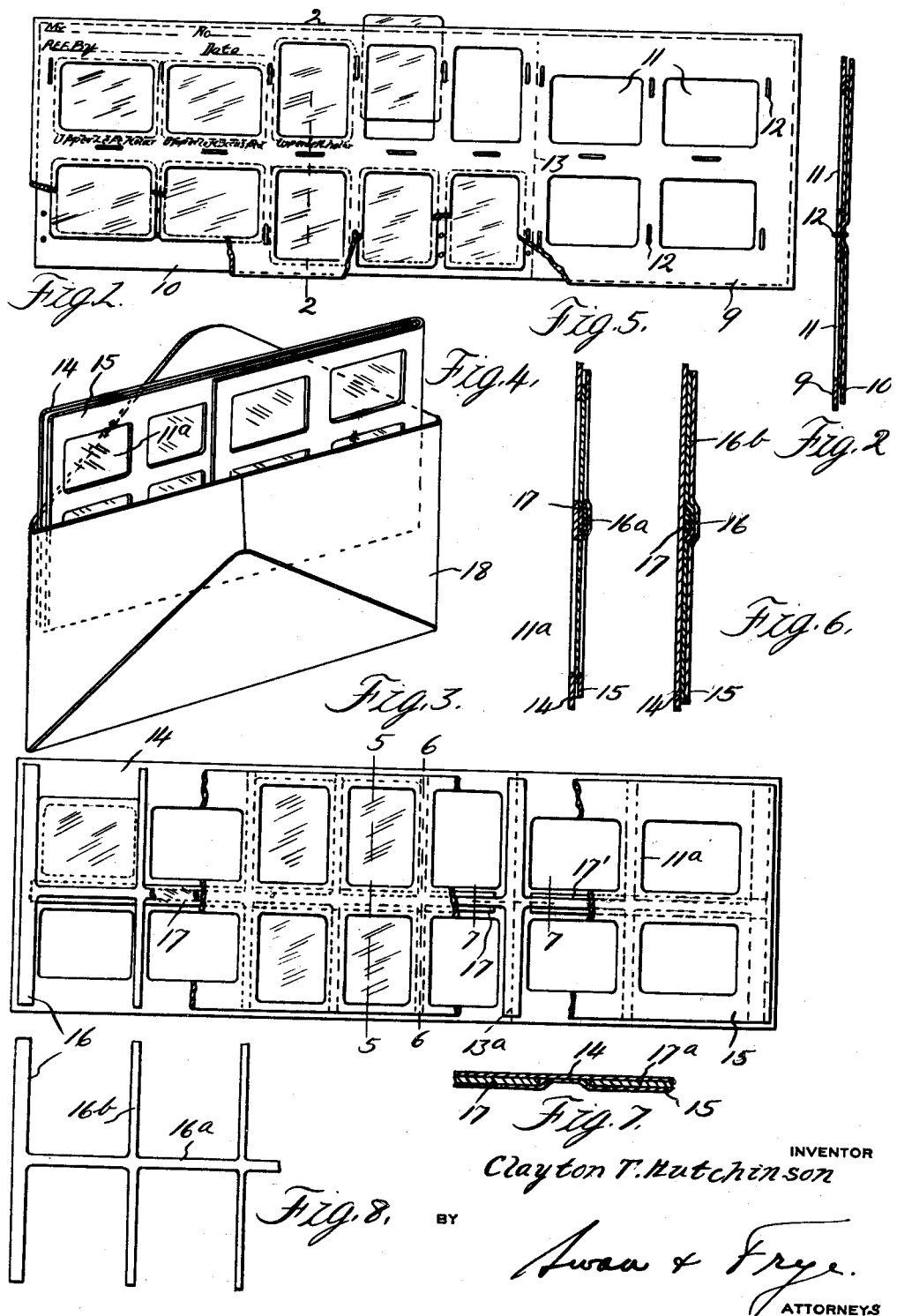
INVENTOR
Clayton T. Hutchinson
BY
Swan & Frye
ATTORNEYS Patented Jan. 12, 1932

1,840,719

UNITED STATES PATENT OFFICE

CLAYTON T. HUTCHINSON, OF DETROIT, MICHIGAN

DENTAL FILM MOUNT

Application filed September 26, 1929. Serial No. 395,282.

This invention relates to mounts for translucent or transparent objects, and more particularly for photographic films arranged in series, such as, for example, dental films.

In modern dental diagnoses, it is customary to make a series of X-ray photographs of various groups of the patient's teeth, or at times, of individual teeth thought to be infected, which photographs are viewed from the films themselves rather than from prints made therefrom. Each film must be carefully studied while being held between the eye and a source of light, and preferably the films of adjacent teeth should be viewed simultaneously or in sequence and compared to determine the possible spread of infection or disease. The present invention has for an object the provision of means for supporting such films in proper sequence while permitting clear vision therethrough.

Another object of this invention is the arrangement of a mount for flexible translucent objects, such as photographic films, which will support the edges of the films and maintain the films in flattened positions without obstructing the view through the "sight" portion of the films.

A further object of this invention is the provision of a plurality of spaced window openings in a multi-ply mount with the intermediate portions of the plies of the mount secured together so that a channel is arranged between each window opening and the adjacent edge of the mount, whereby a thin flexible object, such as a photographic film, may be readily slid in the channel to a position wherein its "sight" portion is exposed to view while its edge portions are supported.

Other objects and advantages will be apparent from the following description, wherein reference is made to the accompanying drawings, illustrating preferred embodiments of my invention and wherein similar reference numerals designate similar parts throughout the several views.

In the drawings:—

Figure 1 is a front view of a mount constructed in accordance with my invention, parts being broken away and shown in section.

Figure 2 is a detail cross section taken substantially on the line 2—2 of Figure 1.

Figure 3 is a front view of a slightly modified embodiment of my invention.

Figure 4 is a perspective showing the mount of Figure 3 in folded position and being inserted into an envelope.

Figures 5, 6 and 7 are detail sectional views taken respectively on the lines 5—5, 6—6 and 7—7 of Figure 3, and Figure 8 is a detail front elevation of the intermediate ply separating the face and rear plates of the mount shown in Figure 3.

Referring now to the drawings, the embodiment illustrated in Figures 1 and 2 comprises a face plate 9 and rear plate 10, each provided with a plurality of window openings 11 which are aligned when the mount is assembled. The several openings may be arranged with their longer axes parallel or perpendicular to the ends of the mount, and as herein shown, I have provided window openings adjacent the ends of the mount with their longer axes perpendicular to the ends of the mount and between such window openings are arranged a plurality of window openings 11, with their longer axes parallel to the end of the mount. This not only provides a symmetrical appearing mount, but also lends itself to easy reading of dental films when assembled in the mount with films showing adjacent teeth in adjacent windows. The usual practice in making X-ray photographs of a patient's teeth is to arrange the films with their longer axes substantially vertical, while the photographs of the central teeth are being made, and with their axes substantially horizontal when photographs of the larger back teeth are being made. Accordingly, when all of the photographs of a patient's teeth are assembled in a mount in their proper sequence, the doctor will be enabled to view all of the films with the teeth shown thereon exactly as they appear in the patient's mouth. I have also shown under the upper set of window openings the proper titles for the teeth displayed in the films that should appear in such window openings to enable the complete presentation of the films of all of the patient's upper teeth. Similar nomenclature may be marked below the lower set of windows. Other suitable markings may also be provided upon the face plate 9, such, for example, as the name of the patient, the file number and what other doctor or the like referred the patient to the one making the X-ray photographs. This enables readily keeping complete information before the doctor whenever he examines the films shown in the mount, and aids materially in reducing to a minimum the space required for maintaining complete records regarding each patient.

The rear plate 10 is preferably of slightly lesser area than the face plate 9, and is unsecured to the face plate except by a plurality of staples 12, or like spaced fasteners, which are preferably arranged substantially as shown in Figure 1 so that three of the staples 12 serve to form side and end guides about each of the window openings 11. This forms a species of channel in which a thin, flexible object, such as a photographic film, may be readily slid from the adjacent upper or lower edge of the mount between the side staples and until it contacts the end staple adjacent any window opening, in which position the "sight" portion of the film would be in alignment with the window opening and accordingly open to view whenever desired. The staples 12 are arranged a suitable distance from the side and inner extremities of the window openings to provide supporting mount portions around all edges of the film when it is properly positioned in the mount, and with the side portion so supported the film will be held in substantially flattened position to enable ready reading of the film disclosure, and resisting the natural tendency of the film to curl, etc. The films can accordingly be kept for an indefinite period in proper positions, and be filed away in the records without impairing the photographs. To aid in storing the mounts with the films therein in ordinary envelopes or file cabinets, I preferably provide means for folding a portion of the mount upon another portion thereof, so that the mount will readily fit in an ordinary legal size envelope. To this end I preferably score the mount from top to bottom on a partition between certain of the windows, and to prevent accidental dislocation of the films in adjacent windows during the folding operation, I provide aligned staples 12 on opposite sides of the scored line 13.

In the embodiment illustrated in Figures 3-8, inclusive, I have shown a mount comprising a face plate 14, rear plate 15 and an intermediate skeleton filler member 16, which serves both to space the front and rear plates and also to secure the mount together. The face plate 14 and rear plate 15 are herein shown as provided with similar aligned spaced window openings 11ª as in the first mentioned embodiment. The partitions between the several openings are braced by the skeleton filler plate 16, and the arms of the filler plate serve as the side guides for the channels in which the films are arranged when properly mounted in the mount. The filler plate 16 has a central longitudinal arm 16ª which aligns with the portions of the face and rear plates between the upper and lower set of window openings, and from this central member 16ª extend spaced side arms 16ᵇ (note Figure 8) which align with the portions of the face and rear plates separating laterally adjacent window openings 11ª. The arms 16ª and 16ᵇ of the filler plate accordingly form three sides of a channel about each window opening, the fourth side being adjacent the top or bottom edge of the mount and is left open to enable the ready insertion or removal of a film whenever desired. The thickness of the filler plate 16 determines the space between the face plate 14 and rear plate 15, and preferably is but little thicker than the usual film used for making photographs. In assembling this embodiment of my improved mount, I preferably coat the faces of the filler plate 16 with a suitable adhesive, and then directly secure the face plate 14 and rear plate 15 to the opposite faces of the filler plate, the adhesive material being the only securing means. To give additional rigidity, however, to the central portion of the mount, one or more reinforcements 17 may be arranged between the face plate and the filler plate. As herein shown, I have provided a pair of such reinforcing strips 17 and 17ª (note Figure 7) the adjacent ends of which are spaced from each other and arranged on opposite sides of the scored line 13ª which aids in properly folding one end portion of the mount upon the remainder of the mount. The folded position of the mount is shown in Figure 4, which also shows how the folded mount may readily be inserted in a conventional envelope 18 for storing.

The simplicity and practicability of my improved mount are believed to be apparent. Provision is made for readily inserting thin, flexible objects, such as photographic films, into open-ended channels wherein the edge portions of a film are supported and the "sight" portion thereof maintained in alignment with the clear window openings. The film can then be readily viewed by holding the mount between the eye of the observer and a suitable source of light. The fingers of the observer need not touch the film, and the film is held in correct flattened position to enable complete viewing of its disclosures. Moreover, the window openings in the rear and face plates, being entirely open, do not in any way impede observance of the film's disclosures, and accordingly obviate the necessity for surface support, as by backs of celluloid or the like, which tend to darken the film disclosure, and in cases of discoloration, or the like, to even deceive the observer into believing that streaks in the celluloid or other parts of the mount were actually upon the film. With my improved mount the films may be kept indefinitely in proper positions, and may be readily stored away in ordinary envelopes or file cabinets during such maintenance.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

Having described my invention, what I claim is:

1. A dental film mount comprising a front plate, a back plate and a skeleton filler plate, all having aligned apertures therein, means for folding the assemblage between certain of the aligned window openings, including an aligned scored line carried by each plate, the scored lines together comprising a fold line, and a plurality of parallel staples securing the plates together and arranged in pairs, with one staple of each pair disposed on each side of the fold line.

2. A mount for translucent objects comprising front and rear plates having a plurality of aligned window openings therein, staples securing the plates together and arranged longitudinally between the window openings, a skeleton framework interposed between the front and back plates, also held by the securing means, arranged to provide guides for the objects on three sides of each window opening, the plates and the interposed skeleton framework being scored for folding on a line between certain of the openings, and a pair of staples arranged one on each side of such scored portion.

In testimony whereof I sign this specification.

CLAYTON T. HUTCHINSON.